United States Patent [19]

Symborski et al.

[11] 4,344,786
[45] Aug. 17, 1982

[54] METHOD AND APPARATUS FOR GATHERING STRAND MATERIAL

[75] Inventors: Alex P. Symborski; Cecil R. Cunningham, both of Anderson, S.C.

[73] Assignee: Owens-Corning Fiberglas Corporation, Toledo, Ohio

[21] Appl. No.: 222,106

[22] Filed: Jan. 2, 1981

[51] Int. Cl.³ .............................. C03D 37/025
[52] U.S. Cl. ............................ 65/2; 65/10.2; 83/913; 229/91; 229/92
[58] Field of Search ............. 65/10.2, 2; 229/91, 229/92; 83/913

[56] References Cited

U.S. PATENT DOCUMENTS 4,175,939 11/1979 Nakazawa et al. ............ 65/10.2
4,194,896 3/1980 Symborski et al. ............ 65/3 R

FOREIGN PATENT DOCUMENTS 2036716 7/1980 United Kingdom ............ 65/10.2

Primary Examiner—Robert L. Lindsay, Jr.
Attorney, Agent, or Firm—Ronald C. Hudgens; Philip R. Cloutier; Ted C. Gillespie

[57] ABSTRACT

A method and apparatus for gathering strand material from a plurality of sources of strand material comprising a rotatable roll means for pulling the strand material from the sources, primary drive means for rotating the roll means, ring means mounted for rotation coaxially with the roll means and adapted to pull strand material from one or more of the sources, secondary drive means for rotating the ring means at rates independent of the rotation of the roll means, and means for axially moving the ring means into and out of communication with the roll means.

13 Claims, 3 Drawing Figures

METHOD AND APPARATUS FOR GATHERING STRAND MATERIAL

TECHNICAL FIELD

This invention relates to apparatus for gathering strand material and, in particular, strand material formed from numerous continuous filaments. More particularly, this invention relates to gathering strand material from a plurality of sources, and pulling the strand material by primary pulling means, such as a cot roll associated with a strand chopping process. In one of its more specific aspects, this invention relates to pulling strand material from a plurality of sources and adding strand material from another such source in a continuous process.

BACKGROUND OF THE INVENTION

A common practice in gathering strand material from a plurality of sources to form a combined strand material is to provide a plurality of sources of the strand material and to feed or direct the output from the sources, commonly called feeder strands, to a common point, such as a gathering shoe. Subsequently, the combined strands are directed toward a rotating roll means such as a cot roll. The strand is directed to be wrapped around the roll means with sufficient friction to enable the combined strand to be pulled by the rotation of the rotating roll means. The rotating roll means can be a winder, pull wheel, or the cot roll of a chopper for forming discrete fibers or chopped strand.

One of the problems associated with winding or chopping operations in which strands are gathered from a plurality of sources is that interruptions in the supply of feeder strands from the sources occasionally occur. Such interruptions necessitate the reintroduction of the interrupted feeder strand to the combined strand subsequent to the restart of the interrupted source of feeder strand material. Attempts to reintroduce a single feeder strand into the combined strand material by manually wrapping the feeder strand to be introduced onto the rotating roll means have been generally unsuccessful. The roll means usually travels at such a high rate of speed that reintroduction of the feeder strand at the normal operating rotational speeds of the primary attenuation means is difficult, if not impossible.

In a present fiber gathering operation, the process for adding a feeder strand to a combined strand involves the slowing down of the roll means to a rotational rate suitable for the successful addition of the feeder strand to the combined strand. Such a method is undesirable in that the slowing down of the roll means can affect the quality of the combined strand produced. For example, the slowing down of a pull wheel or cot roll in a continuous glass fiber forming operation can change the diameter and other characteristics of the glass fibers, thereby adversely affecting the quality of the glass fibers. Accordingly, the combined strand formed during temporary periods of lower attenuation speed is frequently scrapped. There is a need for a method and apparatus for applying a feeder strand to a combined strand without affecting the quality of the combined strand.

SUMMARY OF THE INVENTION

According to this invention, there is provided apparatus for gathering strand material comprising a plurality of sources of strand material, rotatable roll means for pulling the strand material from the sources, primary drive means for rotating the roll means, ring means mounted for rotation coaxially with the roll means and adapted to pull the strand material from one or more of the sources, secondary drive means for rotating the ring means at rates independent of the rotation of the roll means, and means for axially moving the ring means into and out of communication with the roll means.

In one embodiment of the invention, the ring means and the roll means have substantially equal diameters.

In another embodiment of the invention, the ring means has an annular flange which overlaps a portion of the roll means. The annular flange can be adapted to overlap the ring means regardless of the axial movement of the ring means relative to the roll means.

According to this invention, there is also provided apparatus for forming a combined strand of fibers comprising a plurality of feeders for supplying feeder strands of continuous filaments, a rotatable cot roll adapted to pull the feeder strands from each of the feeders, primary drive means for rotating the cot roll, ring means mounted for rotation coaxially with the cot roll and adapted to pull one or more of the feeder strands, secondary drive means for rotating the ring means at rates independent of the rotation of the cot roll, and means for moving the ring means axially into and out of communication with the cot roll.

In a specific embodiment of the invention, a main gathering shoe is adapted to gather the feeder strands and direct them as a combined strand to the cot roll, and the ring means is axially spaced apart from the path of the combined strand, and a hold-off means is adapted to temporarily direct one or more feeder strands toward the ring means.

In another specific embodiment of the invention, means for biasing the ring means toward the cot roll can be provided, and an actuator means can be adapted to move the ring means against the bias and away from the cot roll.

According to this invention, there is also provided apparatus for forming chopped strands of mineral material comprising a plurality of feeders adapted to supply a plurality of streams of molten mineral material, a rotatable cot roll for attenuating the molten mineral material into continuous filaments in the form of a feeder strand associated with each feeder, primary drive means for rotating the cot roll, a cutter roll rotatably mounted for contact with the cot roll to chop strand positioned therebetween, ring means mounted for rotation coaxially with the cot roll and adapted to pull one or more of the feeder strands, the ring means being adapted with an annular flange which overlaps a portion of the cot roll, secondary drive means for rotating the ring means at rates independent of the rotation of the cot roll, and means for moving the ring means axially into and out of communication with the cot roll.

According to this invention, there is also provided a method of gathering strand material comprising gathering strand material from a plurality of sources of strand material to form a combined strand, rotating a roll means at a first rate to pull the combined strand, directing strand material from another source onto a ring means rotating coaxially with the roll means, rotating the ring means at a second rate slower than the first rate to pull the feeder strand, increasing the rotational rate of the ring means to the first rate, and directing the feeder strand onto the roll means.

In a specific embodiment of the invention, the ring means is moved axially toward the roll means after the rotational rate of the ring means is increased to the first rate.

According to this invention, there is also provided a method for forming a combined strand of fibers comprising supplying feeder strands of continuous filaments from a plurality of feeders, gathering the feeder strands to form a combined strand, pulling the combined strand with a rotating cot roll rotating at a first rate, directing the feeder strand from one or more of the feeders onto a ring means rotatable coaxially with the cot roll, the ring means being axially spaced apart from the cot roll, rotating the ring means at a second rate slower than the first rate to pull the feeder strands directed thereto, increasing the rotational rate of the ring means to the first rate, and moving the ring means axially into communication with the cot roll.

In a specific embodiment of the invention, the ring means is biased toward the cot roll and the ring means is held against the bias and out of contact with the cot roll while the rotational rate of the ring means is unequal to the first rate.

In a preferred embodiment of the invention, the combined strand is chopped into discrete lengths.

According to this invention, there is also provided a method for forming chopped strand mineral material comprising supplying a plurality of streams of molten mineral material from a plurality of feeders. attenuating the streams to form feeder strands of continuous filaments of the mineral material, gathering the feeder strands to form a combined strand, pulling the combined strand with a rotating cot roll at a first rate, directing the feeder stand from one or more of the feeders onto a ring means rotatable coaxially with the cot roll and spaced apart from the cot roll, rotating the ring means at a second rate slower than the first rate to pull the feeder strands directed thereto, increasing the rotational rate of the ring means to the first rate, moving the ring means axially into communication with the cot roll, transferring the feeder strands on the ring means to the cot roll, so that the transferred feeder strands are added to the combined strand, and passing the combined strand between the cot roll and a cutter roll to chop the combined strand.

DESCRIPTION OF THE INVENTION

For purposes of illustration, the principles of the invention will be described in the context of a glass fiber forming and gathering operation. It is to be understood that the invention includes uses with other mineral fibers and with other fibrous materials, and with alternative fiber forming methods.

Figure 1:
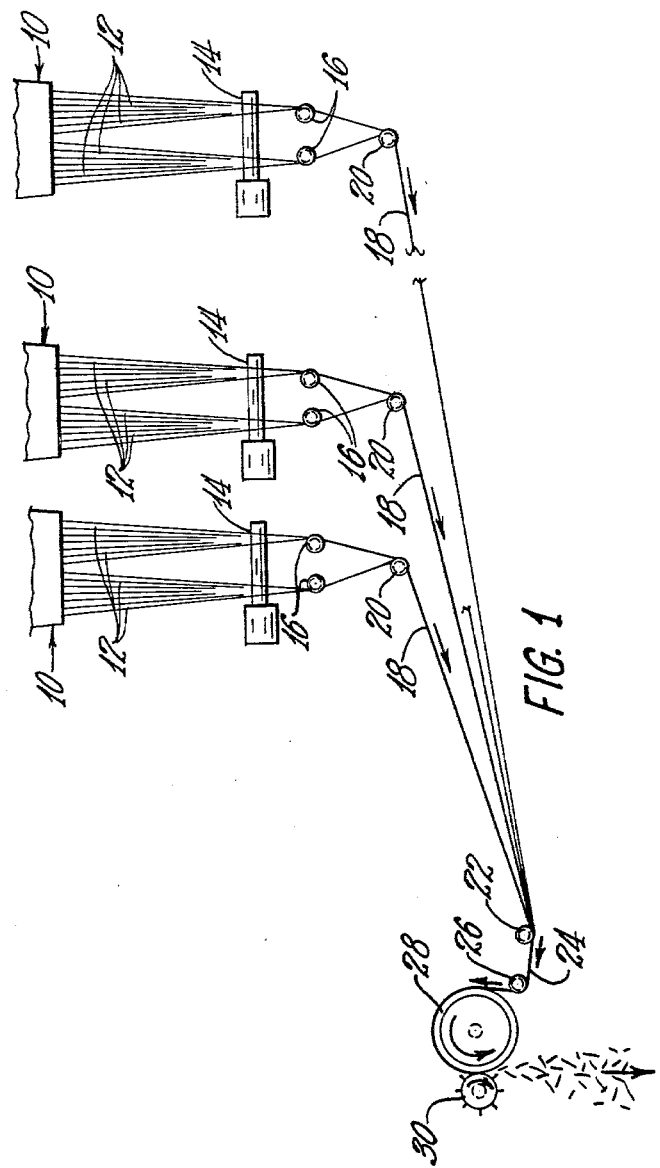
FIG. 1 is a schematic view in elevation of a fiber forming and chopping apparatus according to the principles of the invention.

As shown in FIG. 1, each source of strand material is comprised of feeder 10 which supplies a plurality of streams of molten glass to be attenuated into continuous filaments 12. The filaments can be passed into contact with size applicator 14 and gathered by gathering shoes 16 into feeder strands 18. Idler roll 20 can be positioned beneath the feeder to facilitate the start-up of feeder strands from the feeder. The feeder strands from the plurality of feeders are directed toward main gathering shoe 22 which gathers the feeder strands to form combined strand 24. The combined strand is directed around idler roll 26 and onto a rotatable roll means such as cot roll 28. The roll means is adapted to advance all of the filaments from all of the feeders, and can be adapted to attenuate the filaments from the feeders in a glass fiber forming process. The roll means can be a winder, pull wheel, or a cot roll for forming discrete fibers or chopped strand as is known in the art. Cutter roll 30 is adapted for periodic rotational contact with the cot roll so that glass strand passed between the cutter roll and the cot roll will be chopped into discrete chopped strand fibers.

Figure 2:
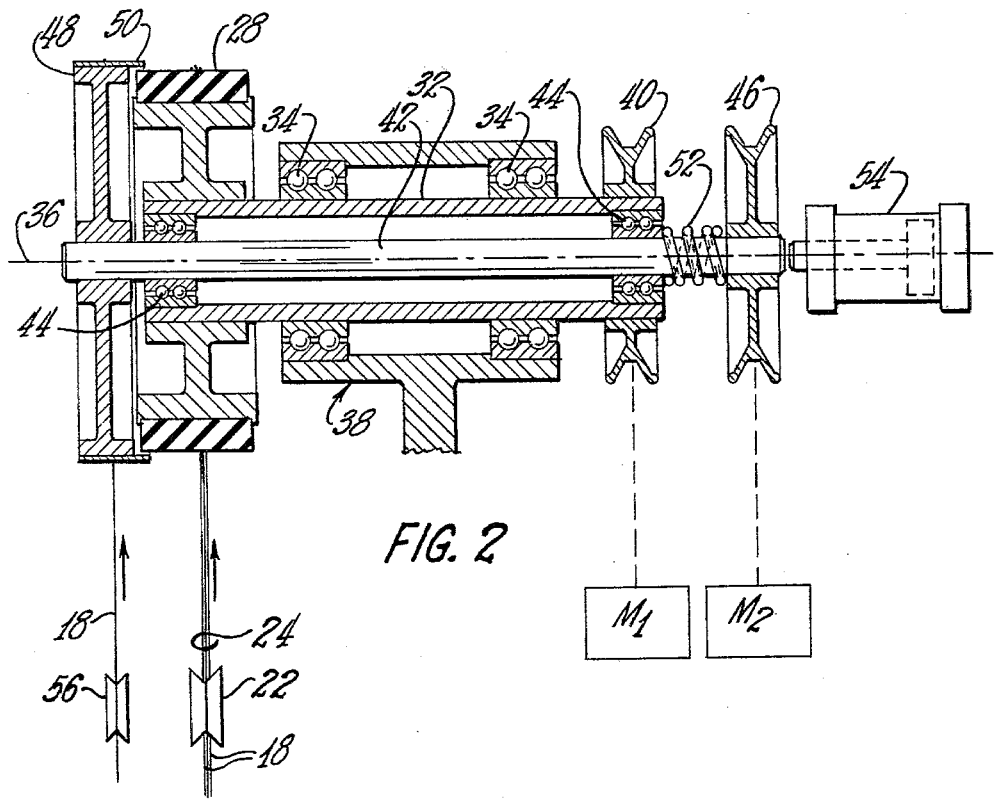
FIG. 2 is a sectional plan view of the start-up ring and cot roll of the apparatus of FIG. 1.

As shown in FIG. 2, the cot roll is mounted for rotation on main drive shaft 32. The main drive shaft itself can be mounted via spindle bearings 34 to rotate about axis of rotation 36 inside frame 38. Main drive pulley 40, which can be driven as shown schematically by motor M-1, can be rigidly mounted on the main drive shaft to drive the cot roll.

Secondary drive shaft 42 is mounted for rotation about the axis of rotation of the main drive shaft. The secondary drive shaft can be mounted via radial axial bearings 44 for rotation within the main drive shaft.

Mounted on the secondary drive shaft is secondary drive pulley 46, which can be driven by motor M-2, as shown schematically. Also mounted on the secondary drive shaft is start-up ring 48. The start-up ring and secondary drive shaft are rotatable about the axis of rotation and are movable axially into and out of communication with the cot roll. When the cot roll and ring means are in communication with each other, transfer of a feeder strand from the ring means to the cot roll is facilitated. The start-up ring has a diameter approximating that of the cot roll. The start-up ring can be adapted with annular overlapping flange 50 which overlaps a portion of the surface of the cot roll so that foreign material is prevented from entering the gap between the cot roll and the start-up ring. Preferably, the overlapping flange is sufficiently wide that a portion of the roll means is overlapped by the ring means regardless of the axial movement of the ring means. Spring 52 can be positioned on the secondary drive shaft to bias the start-up ring axially in the direction of the cot roll. Actuator cylinder 54 can be juxtaposed to the secondary drive shaft to move the secondary drive shaft and start-up ring against the bias of the spring and away from the cot roll.

During normal operation, the feeder strands are fed into the main gathering shoe which combines the feeder strands into the combined strand, which is directed onto the cot roll, as shown in FIG. 2. For purposes of clarity, idler roll 26 is not shown in FIG. 2. In the event a feeder strand is to be reintroduced into the combined strand, the feeder strand to be reintroduced is directed via hold-off means, such as auxiliary guide 56, onto the start-up ring, which has been moved axially away from the cot roll by the action of the actuator cylinder. The start-up ring is driven initially at a relatively low rate of speed by motor M-2. Since the start-up ring is rotating at a low rate, the wrapping of the feeder strand is easily accomplished. Once the feeder strand is being successfully pulled by the start-up ring, the rotational rate of the start-up ring is increased so that it matches the first rate, which is the rotational rate of the cot roll as driven by M-1. The term "rotational rate" is to be understood to mean the rate of linear advancement of the strand being pulled or wound on the rotating member. When the rotational rate of the start-up ring and the cot roll are equal, the actuator cylinder is disengaged, thereby moving the start-up ring into communication with the cot roll. The feeder strand to be added is then transferred from the auxiliary guide to the main gathering shoe and directed to the cot roll, thereby reintroducing the feeder strand to the combined strand. The transfer can be effected manually, or by means of the activation of a knock-off arm or the release of a hold-off arm.

Figure 3:
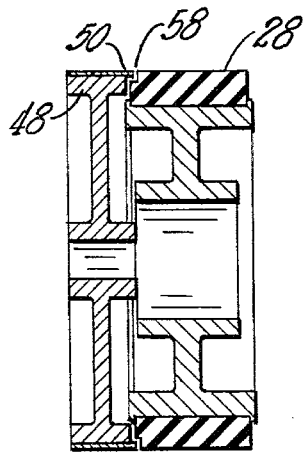
FIG. 3 is a sectional view of an alternate embodiment of the start-up ring and cot roll of the invention.

As shown in FIG. 3, the cot roll can be adapted with notched portion 58 to receive the edge of the annular overlapping flange of the start-up ring, thereby providing a relatively smooth transition surface for the feeder strand when the start-up ring is in communication with the cot roll.

INDUSTRIAL APPLICABILITY

This invention will be found to be useful in the formation of fibers from molten glass for such uses as glass fiber reinforcements and chopped glass fiber strand material.

We claim:

1. Apparatus for gathering strand material comprising a plurality of sources of strand material, rotatable roll means for pulling the strand material from said sources, primary drive means for rotating said roll means, ring means mounted for rotation coaxially with said roll means and adapted to pull the strand material from one or more of said sources, secondary drive means for rotating said ring means at rates independent of the rotation of said roll means, and means for axially moving said ring means into and out of communication with said roll means.

2. The apparatus of claim 1 in which said ring means and said roll means have substantially equal diameters.

3. The apparatus of claim 1 in which said ring means has an annular flange which overlaps a portion of said roll means.

4. The apparatus of claim 3 in which said annular flange is adapted to overlap a portion of said roll means regardless of the axial movement of said ring means relative to said roll means.

5. Apparatus for forming a combined strand of fibers comprising a plurality of feeders for supplying feeder strands of continuous filaments, a rotatable cot roll adapted to pull the feeder strands from each of said feeders, primary drive means for rotating said cot roll, ring means mounted for rotation coaxially with said cot roll and adapted to pull one or more of the feeder strands, secondary drive means for rotating the ring means at rates independent of the rotation of the cot roll, and means for moving said ring means axially into and out of communication with said cot roll.

6. The apparatus of claim 5 comprising a main gathering shoe adapted to gather said feeder strands and direct them as a combined strand to said cot roll, and further comprising said ring means being axially spaced apart from the path of said combined strand, and further comprising hold-off means adapted to temporarily direct one or more feeder strands toward said ring means.

7. The apparatus of claims 5 or 6 comprising means for biasing said ring means toward said cot roll, and actuator means for moving said ring means against the bias and away from said cot roll.

8. Apparatus for forming chopped strands of mineral material comprising a plurality of feeders adapted to supply a plurality of streams of molten mineral material, a rotatable cot roll for attenuating the molten mineral material into continuous filaments in the form of a feeder strand associated with each feeder, primary drive means for rotating said cot roll, a cutter roll rotatably mounted for contact with said cot roll to chop strand positioned therebetween, ring means mounted for rotation coaxially with said cot roll and adapted to pull one or more of the feeder strands, said ring means being adapted with an annular flange which overlaps a portion of said cot roll, secondary drive means for rotating the ring means at rates independent of the rotation of the cot roll, and means for moving said ring means axially into and out of communication with said cot roll.

9. The method for forming chopped strand mineral material comprising supplying a plurality of streams of molten mineral material from a plurality of feeders, attenuating said streams to form feeder strands of continuous filaments of the mineral material, gathering the feeder strands to form a combined strand, pulling said combined strand with a rotating cot roll at a first rate, directing the feeder strand from one or more of the feeders onto a ring means rotatable coaxially with said cot roll and spaced apart from said cot roll, rotating said ring means at a second rate slower than said first rate to pull the feeder strands directed thereto, increasing the rotational rate of said ring means to said first rate, moving said ring means axially into communication with said cot roll, transferring the feeder strands on said ring means to said cut roll, so that the transferred feeder strands are added to said combined strand, and passing said combined strand between said cot roll and a cutter roll to chop the combined strand.

10. A method of gathering strand material comprising gathering strand material from a plurality of sources of strand material to form a combined strand, rotating a roll means at a first rate to pull said combined strand, directing strand material from another source onto a ring means rotating coaxially with said roll means, rotating said ring means at a second rate slower than said first rate to pull said feeder strand, increasing the rotational rate of said ring means to said first rate, moving said ring means axially toward said roll means, and directing said feeder strand onto said roll means.

11. A method for forming a combined strand of fibers comprising supplying feeder strands of continuous filaments from a plurality of feeders, gathering the feeder strands to form a combined strand, pulling said combined strand with a rotating cot roll rotating at a first rate, directing the feeder strand from one or more of said feeders onto a ring means rotatable coaxially with said cot roll, said ring means being axially spaced apart from said cot roll, rotating said ring means to pull the feeder strands directed thereto at a second rate slower than said first rate, increasing the rotational rate of said ring means to said first rate, and moving said ring means axially into communication with said cot roll.

12. The method of claim 11 comprising biasing said ring means toward said cot roll and holding said ring means against the bias and out of contact with said cot roll while the rotational rate of said ring means is unequal to said first rate.

13. The method of claim 11 comprising chopping said combined strand into discrete lengths.

* * * * *